US010652011B2

(12) United States Patent
Bos et al.

(10) Patent No.: US 10,652,011 B2
(45) Date of Patent: May 12, 2020

(54) WHITE-BOX IMPLEMENTATIONS WITH GARBLED CIRCUITS

(71) Applicant: NXP B.V., Eindhoven (NL)

(72) Inventors: Joppe Willem Bos, Wijgmaal (BE);
Jan Hoogerbrugge, Helmond (NL);
Marc Joye, Palo Alto, CA (US);
Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 169 days.

(21) Appl. No.: 15/617,940

(22) Filed: Jun. 8, 2017

(65) Prior Publication Data
US 2018/0359082 A1    Dec. 13, 2018

(51) Int. Cl.
| G06F 21/00 | (2013.01) |
| H04L 9/06 | (2006.01) |
| H04L 9/30 | (2006.01) |
| G09C 1/00 | (2006.01) |
| G06F 21/60 | (2013.01) |

(52) U.S. Cl.
CPC .......... *H04L 9/0631* (2013.01); *G06F 21/602* (2013.01); *G06F 21/604* (2013.01); *G09C 1/00* (2013.01); *H04L 9/30* (2013.01); *H04L 2209/12* (2013.01); *H04L 2209/16* (2013.01)

(58) Field of Classification Search
CPC . H04L 9/00; H04L 9/06; H04L 9/0618; H04L 9/0631; H04L 9/0643; H04L 9/30; H04L 9/3247; G06F 21/60; G06F 21/602; G06F 21/604
See application file for complete search history.

(56) References Cited

U.S. PATENT DOCUMENTS

| 2011/0216902 A1* | 9/2011 | Kolesnikov | ............... | H04L 9/06 380/47 |
| 2012/0079602 A1* | 3/2012 | Kolesnikov | ........... | H04L 9/0662 726/26 |
| 2017/0163421 A1* | 6/2017 | Chase | ................... | H04L 9/3066 |

OTHER PUBLICATIONS

Chow, et al., "A White-Box DES Implementation for DRM Applications", Digital Rights Management: ACM CCS-9 Workshop, DRM 2002, Washington, D.C., USA, Nov. 18, 2002, 1-16.
Chow, "White-Box Cryptography and an AES Implementation", Cryptography: 9th Annual International Workshop, SAC 2002, St. John's, Newfoundland, Canada, Aug. 15, 2002.
Even, et al., "A Randomized Protocol for Signing Contracts", Compute Science Department, Technion-Israel Institute of Technology; 1998, pp. 205-210.
Lindell, et al., "A Proof of Security of Yao's Protocol for Two-Party Computation", J. Cryptol. (2009) 22: 161-188.
Rabin, "How to Exchange Secrets with Oblivious Transfer", Technical Report TR-81, Aiken Computation Lab, Harvard University Ma 20, 1981—26 pages.

(Continued)

*Primary Examiner* — Edward Zee

(57) ABSTRACT

A method for producing a white-box implementation of a cryptographic function using garbled circuits, including: producing, by a first party, a logic circuit implementing the cryptographic function using a plurality of logic gates and a plurality of wires; garbling the produced logic circuit, by the first party, including garbling the plurality of logic gates and assigning two garbled values for each of the plurality of wires; and providing a second party the garbled logic circuit and a first garbled circuit input value.

18 Claims, 1 Drawing Sheet

(56) References Cited

OTHER PUBLICATIONS

Yao, "How to Generate and Exchange Secrets", extended abstract, Dept. of Computer Science, Princeton University, Princeton, New Jersey, 1986 IEEE, pp. 162-167.
Lindell, Yehuda et al.; "Implementing Two-Party Computation Efficiently with Security Against Malicious Adversaries;" Sep. 10, 2008 Security and Cryptography for Networks; [Lecture Notes in Computer Science], Springer Berlin Heidelberg, Berlin, Heidelberg, pp. 2-20, XP019104378, SBN: 978-3-540-85854-6.
Pinkas, Benny et al.; "Secure Two-Party Computation is Practical;" International Association for Cryptologic Research,, vol. 20090902:075811, Sep. 2, 2009 (Sep. 2, 2009), pp. 1-20, XP061003564, [retrieved on Sep. 2, 2009].
Jarvinen, Kimmo et al.; "Garbled Circuits for Leakage-Resilience: Hardware Implementation and Evaluation of One-Time Programs;" CHES10 Proceedings of the 12th International Conference on Cryptographic Hardware and Embedded Systems, CHES 2010; Santa Barbara, California, Aug. 17-20, 2010; Lecture Notes in Computer Science, vol. 6225. Springer, Berlin, Heidelberg; DOI: 10.1007/978-3-642-15031-9_26.

* cited by examiner

WHITE-BOX IMPLEMENTATIONS WITH GARBLED CIRCUITS

TECHNICAL FIELD

Various exemplary embodiments disclosed herein relate generally to white-box implementations of cryptographic functions using garbled circuits.

BACKGROUND

White-box cryptography is aimed at protecting secret keys from being disclosed in a software implementation of a cryptographic or secure function. In such a context, it is assumed that the attacker (usually a "legitimate" user or malicious software) may also control the execution environment of the software implementation. This is in contrast with the more traditional security model where the attacker is only given a black-box access (i.e., inputs/outputs) to the cryptographic function under consideration.

The main idea of white-box implementations is to rewrite a key-instantiated version so that all information related to the key is hidden in the software implementation of the cryptographic or secure function. In other words, for each secret key, a key-customized software is implemented so that the key input is unnecessary. In other embodiments, the secret key may be an input to the white-box implementation. In such a case the key may be encoded.

Most symmetric block-ciphers, including the AES and the DES, are implemented using substitution boxes and linear transformations. Imagine that such a cipher is white-box implemented as a huge lookup table taking on input any plaintext and returning the corresponding ciphertext for a given key. Observe that this white-box implementation has exactly the same security as the same cipher in the black-box context: the adversary learns nothing more than pairs of matching plaintexts/ciphertexts. Typical plaintexts being 64-bit or 128-bit values, such an ideal approach cannot be implemented in practice because of the size of the resulting lookup table.

Current white-box implementations apply the above basic idea to smaller components of the cryptographic function. These white-box implementations represent each component as a series of lookup tables and insert random input and output objective encodings on the lookup tables to introduce ambiguity, so that the resulting algorithm appears as the composition of a series of lookup tables with randomized values.

To add further protection, external (key-independent) encodings may be used by replacing the encryption function $E_K$ (respectively, decryption function $E_K^{-1}$) with the composition $E'_K = G \circ E_K \circ F^{-1}$ (respectively, $E'_K{}^{-1} = F \circ E_K^{-1} \circ G^{-1}$). Input encoding function F and output decoding function $G^{-1}$ (respectively, G and $F^{-1}$) should not be made available on the platform that computes $E'_K$ (respectively, $E'_K{}^{-1}$) so that the white-box implementation cannot be used to compute $E_K$ (respectively, $E_K^{-1}$). Although the resulting implementation is not standard, such an approach is reasonable for many applications.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments are described, wherein a cryptographic key is embedded in the cryptographic function.

Various embodiments are described, wherein a cryptographic key is an input to the garbled circuit as a second garbled input, and the second party is provided a second garbled input.

Various embodiments are described, wherein the cryptographic function is an advanced encryption standard (AES) function.

Various embodiments are described, wherein the cryptographic function is a public key encryption function.

Various embodiments are described, wherein the cryptographic function is a digital signature function.

Various embodiments are described, wherein the cryptographic function is a message authentication function.

Various embodiments are described, further including evaluating the garbled logic circuit by the second party to produce a garbled output that second party maps to a real output value of the cryptographic function.

Various embodiments are described, wherein garbled logic circuit includes a plurality of garbled lookup tables implementing a portion of the logic gates.

Various embodiments are described, wherein one of the lookup tables LUT receives an input $x=(x_0, \ldots, x_{m-1})_2 \in \{0, 1\}^m$, produces an output $y=\text{LUT}(x)=(y_0, \ldots, y_{n-1})_2 \in \{0,1\}^n$, and wherein assigning two garbled values for each of the plurality of wires includes assigning each wire $\check{w}_i (0 \le i \le m-1)$ with two garbled values, $K_{\check{w}_i}^0 = (k_{\check{w}_i}^0, \pi_{\check{w}_i}^0)$ and $K_{\check{w}_i}^1 = (k_{\check{w}_i}^1, \pi_{\check{w}_i}^1)$, where $k_{\check{w}_i}^0, k_{\check{w}_i}^1 \in_R \{0,1\}^K$ and $\pi_{\check{w}_i}^0 \in_R \{0,1\}$ and $\pi_{\check{w}_i}^1 = 1 - \pi_{\check{w}_i}^0$ further including: computing garbled LUT as follows:

$$LUT\left[\sum_{i=0}^{m-1} \pi_{\check{w}_i}^{x_i} 2^i\right] = \mathcal{E}_{\left(k_{\check{w}_0}^{x_0} \| \ldots \| k_{\check{w}_{m-1}}^{x_{m-1}}\right)}\left(K_{\check{w}_0}^{y_0} \| \ldots \| K_{\check{w}_{n-1}}^{y_{n-1}}\right),$$

for all possible x.

Various embodiments are described, wherein assigning two garbled values for each of the plurality of wires includes assigning each wire $\check{w}_i (0 \le i \le m-1)$ with two garbled values, $K_{\check{w}_i}^0 = (k_{\check{w}_i}^0, \pi_{\check{w}_i}^0)$ and $K_{\check{w}_i}^1 = (k_{\check{w}_i}^1, \pi_{\check{w}_i}^1)$, where $k_{\check{w}_i}^0, k_{\check{w}_i}^1 \in_R \{0,1\}^K$ and $\pi_{\check{w}_i}^0 \in_R \{0,1\}$ and $\pi_{\check{w}_i}^1 = 1 - \pi_{\check{w}_i}^0$.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In its basic version, Yao's protocol (a.k.a. garbled circuits) allows for the two-party evaluation of a function $f(x_1,x_2)$ in the presence of semi-honest adversaries. The protocol is run between the input owners ($a_i$ denotes the private input of user i). At the end of the protocol, the value of $f(a_1,a_2)$ is obtained, but no party learns more than what is revealed from this output value.

The protocol operates as follows. The first party, called the garbler, builds a garbled version of a circuit for computing a function $f$. Both partied know the function $f$ and the circuit before garbling. The first party then gives to the second party, called evaluator, the garbled circuit as well as the garbled-circuit input values that correspond to $a_1$ (and only those for $a_1$). The notation GI ($a_1$) is used to denote these input values. The first party also provides the mapping between the garbled-circuit output values and the actual bit values. Upon receiving the circuit, the evaluator engages in a 1-out-of-2 oblivious transfer protocol with the garbler, playing the role of the chooser, so as to obliviously obtain the garbled-circuit input values corresponding to its private input $a_2$, GI ($a_1$). From GI ($a_1$) and GI ($a_2$), the evaluator can therefore calculate $f(a_1, a_2)$ using the garbled versions of $f$ and GI ($a_1$) and GI ($a_2$).

In more detail, the protocol evaluates the function $f$ through a Boolean circuit. To each wire $w_i$ of the circuit, the garbler associates two random cryptographic keys, $K_{w_i}^0$ and $K_{w_i}^1$, that respectively correspond to the bit-values $b_i=0$ and $b_i=1$. Next, for each binary gate g (e.g., an OR-gate) with input wires ($w_i,w_j$) and output wire $w_k$, the garbler computes the four ciphertexts $$\mathcal{E}_{\left(K_{w_i}^{b_i}, K_{w_j}^{b_j}\right)}\left(K_{w_k}^{g(b_i,b_j)}\right) \text{ for } b_i, b_j, \in \{0, 1\}.$$

Figure 1:
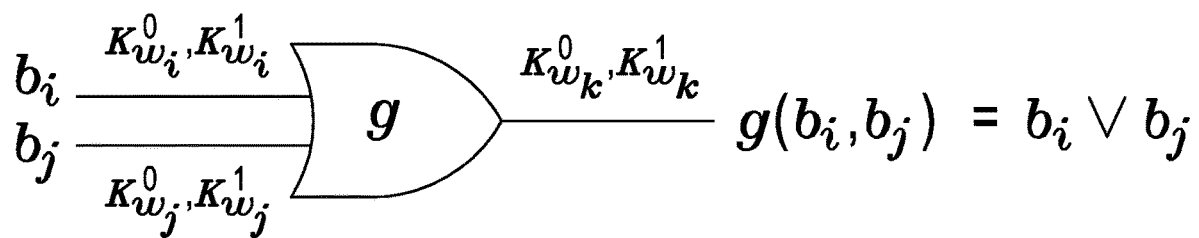
FIG. 1 illustrates a garbled OR gate.

FIG. 1 illustrates a garbled OR gate that implements the function above. The set of these four randomly ordered ciphertexts defines the garbled gate as shown in the table below.

| $b_i$ | $b_j$ | $g(b_i, b_j)$ | Garbled value |
|---|---|---|---|
| 0 | 0 | 0 | $\mathcal{E}_{\left(K_{w_i}^0, K_{w_j}^0\right)}\left(K_{w_k}^0\right)$ |
| 0 | 1 | 1 | $\mathcal{E}_{\left(K_{w_i}^0, K_{w_j}^1\right)}\left(K_{w_k}^1\right)$ |
| 1 | 0 | 1 | $\mathcal{E}_{\left(K_{w_i}^1, K_{w_j}^0\right)}\left(K_{w_k}^1\right)$ |
| 1 | 1 | 1 | $\mathcal{E}_{\left(K_{w_i}^1, K_{w_j}^1\right)}\left(K_{w_k}^1\right)$ |

The symmetric encryption algorithm $\varepsilon$, which is keyed by a pair of keys, has indistinguishable encryptions under chosen-plaintext attacks. It is also noted that for the given pair of keys $(K_{w_i}^{b_i}, K_{w_j}^{b_j})$, the corresponding decryption process unambiguously recovers the value of $K_{w_k}^{g(b_i,b_j)}$ from the four ciphertexts constituting the garbled gate. It is worth noting that the knowledge of $(K_{w_i}^{b_i}, K_{w_j}^{b_j})$ yields only the value of $K_{w_k}^{g(b_i,b_j)}$ and that no other output values can be recovered for this gate. So the evaluator can evaluate the entire garbled circuit gate-by-gate so that no additional information leaks about intermediate computations.

From the description above it can be seen that garbled circuits are a very powerful tool. However, there is one significant restriction: the security is compromised when more than one circuit-input is provided. Hence, when computing f on new inputs requires to create a different garbled version of the circuit (and the inputs). Typically, implementing garbled circuits includes a number of steps including:

determining a logic circuit to implement the function $f$;

garbling this circuit by the first party, the garbler;

providing the second party, the evaluator, with this garbled circuit $f$ and the garbled circuit input values GI ($a_1$) and GI ($a_2$) which correspond (can be mapped) to the real input values $a_1$ and $a_2$ of the circuit (using oblivious transfer); and evaluating the circuit and obtaining the garbled-circuit output by the second party, which is denoted by GO ($a_3$) which may be mapped by the garbler to the real output value $a_3=f(a_1,a_2)$.

Embodiments that instantiate the cryptographic function $f$ in the white-box model using garbled circuits will now be described. The garbling of the cryptographic function $f$ may be done once and provided to the target platform or user that needs to compute the cryptographic function $f$. On a regular interval one could update this circuit implementation of $f$ for security reasons.

The garbled circuit of $f$ may be represented as a circuit of gates where the gates have two or more inputs. This approach may be used to instantiate fixed and dynamic instantiated white-box implementations.

In the fixed key setting, the fixed secret key is already embedded in the cryptographic algorithm. This combination of the cryptographic algorithm and the fixed key is used as the function $f$ for which a garbled circuit is created. The input to the evaluator is just the garbled input value of the message which needs to be encrypted/decrypted or signed by the cryptographic function $f$.

In the dynamic key setting a garbled circuit $f$ of the target cryptographic primitive is used. The input to the algorithm is a tuple of values (GI ($a_1$), GI ($a_2$)) where $a_1$ is the secret key and $a_2$ is the input message to the algorithm. Alternatively, $a_1$ may be the input message to the algorithm, and $a_2$ may be the secret key.

In the setting of white-box cryptography, it is common practice to allow external encodings on the input and output values of the algorithm. Therefore, it may be assumed that garbled input values correspond to the external input encoding and the garbled output values have an external encoding on top of them. This significantly simplifies the approach. No oblivious transfer is needed because the garbled inputs are simply sent to the target platform. An example of $f$ could be a block-cipher which computes a decryption of a message where both the input and output have external encodings applied to them.

Figure 2:
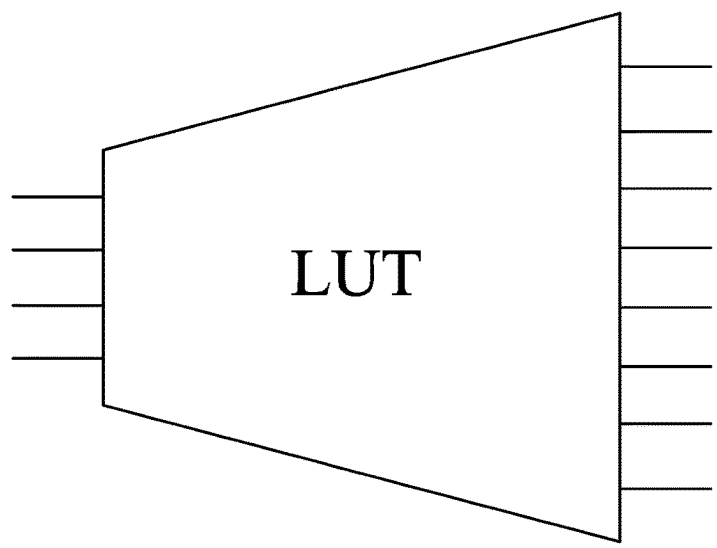
FIG. 2 illustrates a gate that has m input bits and n output bits.

It will now be described how to garble a look-up table (LUT) with m input bits and n output bits. FIG. 2 illustrates a gate that has m input bits and n output bits. This is a generalization of the binary gate which use m=2 and n=1. A method of implementing the cryptographic function using garbled circuits may be as follows:

1. Assign each input wire $\breve{w}_i$ ($0 \le i \le m-1$) with two garbled values, $K_{\breve{w}_i}^0 = (k_{\breve{w}_i}^0, \pi_{\breve{w}_i}^0)$ and $K_{\breve{w}_i}^1 = (k_{\breve{w}_i}^1, \pi_{\breve{w}_i}^1)$, where $k_{\breve{w}_i}^0, k_{\breve{w}_i}^1 \in_R \{0,1\}^K$, K is the key length and $\pi_{\breve{w}_i}^0 \in_R \{0,1\}$ and $\pi_{\breve{w}_i}^1 = 1 - \pi_{\breve{w}_i}^0$;
2. Do the same for each output wire $\breve{w}_j$ ($0 \le j \le n-1$);
3. For all possible $x = (x_0, \ldots, x_{m-1})_2 \in \{0,1\}^m$
   a. let $y = \text{LUT}(x) = (y_0, \ldots, y_{n-1})_2 \in \{0,1\}^n$ and
   b. compute:

$$T\left[\sum_{i=0}^{m-1} \pi_{\breve{w}_i}^{x_i} 2^i\right] = \mathcal{E}_{\left(k_{\breve{w}_0}^{x_0} \| \ldots \| k_{\breve{w}_{m-1}}^{x_{m-1}}\right)}\left(K_{\breve{w}_0}^{y_0} \| \ldots \| K_{\breve{w}_{n-1}}^{y_{n-1}}\right)$$

Return the garbled table $\mathcal{T}^{LUT} = (T[0], \ldots, T[2^m - 1])$.

In order to evaluate this garbled table the evaluator receives as inputs;

$K_{\breve{w}_0} = (k_{\breve{w}_0}, \pi_{\breve{w}_0}), \ldots, K_{\breve{w}_{m-1}} = (k_{\breve{w}_{m-1}}, \pi_{\breve{w}_{m-1}})$; and $\mathcal{T}^{LUT}$.

The evaluator computes the output as follows:
compute $\iota = \sum_{i=0}^{m-1} \pi_{\breve{w}_i} 2^i$; and
compute $$\mathcal{E}^{-1}_{\left(k_{\breve{w}_0} \| \ldots \| k_{\breve{w}_{m-1}}\right)}(T[\iota])$$

and get $K_{\breve{w}_0} \| \ldots \| K_{\breve{w}_{n-1}}$.

The embodiments described herein may be applicable to any cryptographic algorithm, including public-key algorithms, keyed hash algorithms, digital signature algorithms, and message authentication algorithms. They may be used as a building block to design protected implementations in the white-box context.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for producing a white-box implementation of a cryptographic function $f$ using garbled circuits, comprising:
   producing, by a first party, a logic circuit implementing the cryptographic function $f$ fusing a plurality of logic gates and a. plurality of wires;
   garbling the produced logic circuit, by the first party, including garbling the plurality of logic gates and assigning two garbled values for each of the plurality of wires, wherein the garbled produced logic circuit includes a plurality of garbled lookup tables implementing a portion of the plurality of logic gates;
   providing to a second party the garbled produced logic circuit and a first garbled circuit input value, wherein the first garbled circuit input value is sent to the second party without engaging in an oblivious transfer protocol; and
   evaluating the garbled produced logic circuit by the second party to produce a garbled output value that the second party maps to a real output value of the cryptographic function $f$;
   wherein the producing of the white-box implementation of the cryptographic function $f$ using garbled circuits comprises:
   applying external encodings to the garbled circuit input and garbled output values, so that the garbled circuit input values correspond to an external input encoding value subjected to an external input encoding function F, and the garbled output values are subjected to an external output encoding function G so as to have an external encoding on top of the garbled output values,
   using the external encodings in replacing the cryptographic function $f$ by a composition $f' = G \circ f \circ F^{-1}$, wherein F is the external input encoding function, G is the external output encoding function, and the external input encoding function F and the external output encoding function G are not made available on the platform that computes $f'$.

2. The method of claim 1, wherein a cryptographic key is embedded in the cryptographic function $f$.

3. The method of claim 1, wherein the cryptographic function $f$ is an advanced encryption standard (AES) function.

4. The method of claim 1, wherein the cryptographic function $f$ is a public key encryption function.

5. The method of claim 1, wherein the cryptographic function $f$ is a digital signature function.

6. The method of claim 1, wherein the cryptographic function $f$ is a message authentication function.

7. The method of claim 1, wherein one of the plurality of garbled lookup tables LUT receives an input $x = (x_0, \ldots, x_{m-1})_2 \in \{0,1\}^m$, produces an output $y = \text{LUT}(x) = (y_0, \ldots, y_{n-1})_2 \in \{0,1\}^n$, and wherein assigning two garbled values for each of the plurality of wires includes assigning each wire $\breve{w}_i$ ($0 \le i \le m-1$) with two garbled values, $K_{\breve{w}_i}^0 = (k_{\breve{w}_i}^0, \pi_{\breve{w}_i}^0)$ and $K_{\breve{w}_i}^1 = (k_{\breve{w}_i}^1, \pi_{\breve{w}_i}^1)$, where $k_{\breve{w}_i}^0, k_{\breve{w}_i}^1 \in_R \{0,1\}^K$ and $\pi_{\breve{w}_i}^0 \in_R \{0,1\}$ and $\pi_{\breve{w}_i}^1 = 1 - \pi_{\breve{w}_i}^0$ further comprising:

computing garbled LUT as follows:

$$LUT\left[\sum_{i=0}^{m-1} \pi_{\check{w}_i}^{x_i} 2^i\right] = \varepsilon_{\left(k_{\check{w}_0}^{x_0} \|...\| k_{\check{w}_{m-1}}^{x_{m-1}}\right)}\left(K_{\check{w}_0}^{y_0}\| \ldots \|K_{\check{w}_{n-1}}^{y_{n-1}}\right),$$

for all possible $x$.

8. The method of claim 1, wherein assigning two garbled values for each of the plurality of wires includes assigning each wire $\check{w}_i(0\leq i\leq m-1)$ with two garbled values, $K_{\check{w}_i}^0=(k_{\check{w}_i}^0, \pi_{\check{w}_i}^0)$ and $K_{\check{w}_i}^1=(k_{\check{w}_i}^1,\pi_{\check{w}_i}^1)$, where $k_{\check{w}_i}^0, k_{\check{w}_i}^1 \in_R \{0,1\}^K$ and $\pi_{\check{w}_i}^0 \in_R \{0,1\}$ and $\pi_{\check{w}_i}^1 = 1-\pi_{\check{w}_i}^0$.

9. The method of claim 1, wherein a cryptographic key is an input to the garbled produced logic circuit as a second garbled circuit input value, and the second party is provided the second garbled circuit input value.

10. A non-transitory machine-readable storage medium encoded with instructions for execution to perform a method for producing a white-box implementation of a cryptographic function $f$ using garbled circuits, comprising:
- instructions for producing, by a first party, a logic circuit implementing the cryptographic function $f$ using a plurality of logic gates and a plurality of wires;
- instructions for garbling the produced logic circuit, by the first party, including arbling the plurality of logic gates and assigning two garbled values for each of the plurality of wires, wherein the garbled produced logic circuit includes a plurality of garbled lookup tables implementing a portion of the plurality of logic gates;
- instructions for providing to a second party the garbled produced logic circuit and a first garbled circuit input value, wherein the first garbled circuit input value is sent to the second party without engaging in an oblivious transfer protocol ; and
- instructions for evaluating the garbled produced logic circuit by the second party to produce a garbled output value that the second party maps to a real output value of the cryptographic function $f$:
- wherein the producing of the white-box implementation of the cryptographic function $f$ using garbled circuits comprises:
- applying external encodings to the garbled circuit input and garbled output values, so that the garbled circuit input values correspond to an external input encoding value subjected to an external input encoding function F, and the garbled output values are subjected to an external output encoding function G so as to have an external encoding on top of the garbled output values, using the external encodings in replacing the cryptographic function $f$ by a composition $f'=G \circ f \circ F^{-1}$, wherein F is the external input encoding function, G is the external output encoding function, and the external input encoding function F and the external output encoding function G are not made available on the platform that computes $f'$.

11. The non-transitory machine-readable storage medium of claim 10, wherein a cryptographic key is embedded in the cryptographic function $f$.

12. The non-transitory machine-readable storage medium of claim 10, wherein the cryptographic function $f$ is an advanced encryption standard (AES) function.

13. The non-transitory machine-readable storage medium of claim 10, wherein the cryptographic function $f$ is a public key encryption function.

14. The non-transitory machine-readable storage medium of claim 10, wherein the cryptographic function $f$ is a digital signature function.

15. The non-transitory machine-readable storage medium of claim 10, wherein the cryptographic function $f$ is a message authentication function.

16. The non-transitory machine-readable storage medium of claim 10, wherein one of the plurality of garbled lookup tables LUT receives an input $x=(x_0, \ldots, x_{m-1})_2 \in \{0,1\}^m$, produces an output $y=LUT(x)=(y_0, \ldots, y_{n-1})_2 \in \{0,1\}^n$, and wherein assigning two garbled values for each of the plurality of wires includes assigning each wire $\check{w}_i(0\leq i\leq m-1)$ with two garbled values, $K_{\check{w}_i}^0=(k_{\check{w}_i}^0,\pi_{\check{w}_i}^0)$ and $K_{\check{w}_i}^1=(k_{\check{w}_i}^1, \pi_{\check{w}_i}^1)$, where $k_{\check{w}_i}^0, k_{\check{w}_i}^1 \in_R \{0,1\}^K$ and $\pi_{\check{w}_i}^0 \in_R \{0,1\}$ and $\pi_{\check{w}_i}^1=1-\pi_{\check{w}_i}^0$ further comprising:
instructions for computing garbled LUT as follows:

$$LUT\left[\sum_{i=0}^{m-1} \pi_{\check{w}_i}^{x_i} 2^i\right] = \varepsilon_{\left(k_{\check{w}_0}^{x_0} \|...\| k_{\check{w}_{m-1}}^{x_{m-1}}\right)}\left(K_{\check{w}_0}^{y_0}\| \ldots \|K_{\check{w}_{n-1}}^{y_{n-1}}\right),$$

for all possible x.

17. The non-transitory machine-readable storage medium of claim 10, wherein assigning two garbled values for each of the plurality of wires includes assigning each wire $\check{w}_i(0\leq i\leq m-1)$ with two garbled values, $K_{\check{w}_i}^0=(k_{\check{w}_i}^0,\pi_{\check{w}_i}^0)$ and $K_{\check{w}_i}^1=(k_{\check{w}_i}^1,\pi_{\check{w}_i}^1)$, where $k_{\check{w}_i}^0, k_{\check{w}_i}^1\in_R\{0,1\}^K$ and $\pi_{\check{w}_i}^0 \in_R \{0,1\}$ and $\pi_{\check{w}_i}^1=1-\pi_{\check{w}_i}^0$.

18. The non-transitory machine-readable storage medium of claim 10, wherein a cryptographic key is an input to the garbled produced logic circuit as a second garbled circuit input value, and the second party is provided the second garbled circuit input value.

* * * * *